United States Patent
Bravery et al.

(10) Patent No.: US 8,341,465 B2
(45) Date of Patent: Dec. 25, 2012

(54) DATA THROUGH COMMUNITY FEEDBACK (75) Inventors: Andrew J. F. Bravery, Salisbury (GB); Luba Cherbakov, McLean, VA (US); Aroopratan D. Pandya, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/105,952

(22) Filed: Apr. 18, 2008

(65) Prior Publication Data
US 2009/0265436 A1 Oct. 22, 2009

(51) Int. Cl.
*G06F 11/00* (2006.01)
(52) U.S. Cl. .......................................... 714/46
(58) Field of Classification Search ............ 714/46
See application file for complete search history.

(56) References Cited

U.S. PATENT DOCUMENTS

| | | | |
|---|---|---|---|
| 6,591,413 B1 | 7/2003 | Humphrey et al. | |
| 6,666,049 B1 * | 12/2003 | Katende et al. | 62/656 |
| 2003/0084120 A1 | 5/2003 | Egli | |
| 2004/0186661 A1 * | 9/2004 | Barton | 701/200 |
| 2007/0101208 A1 | 5/2007 | Mohr | |
| 2007/0288292 A1 * | 12/2007 | Gauger | 705/9 |

* cited by examiner

*Primary Examiner* — Scott Baderman
*Assistant Examiner* — Yair Leibovich
(74) *Attorney, Agent, or Firm* — Yudell Isidore Ng Russell PLLC (57) ABSTRACT

A method, system and computer program product for providing a framework to enable a builder to construct a situational application, wherein the framework provides access to one or more background data sources. A graphical user interface is displayed to receive feedback inputs, including one or more inputs which describe the problem detected within a data item of a situational application, by an end-user. Feedback inputs may include a unique identifier of the problem data item and identification details of the service from which the data originates. A second input may be of a note, which provides suggestions for improving the data within the data item. Preference information is provided to a notification agent within the framework of the situational application about whether the owner of the data allows direct correction of the data and whether feedback input has to be stored in a problem cache. The feedback input is passed to a notification agent of the framework, which identifies the owner and/or builder of the data.

6 Claims, 5 Drawing Sheets

Notification Agent 300  ⬍ ▢ ✕

*In the text box below please identify the information to be corrected:* 315

*Jersey City* - Located just outside the Jersey Tunnel from NYC, Jersey City is New Jersey's 2nd largest City, with 240,000 residents. A mixture of Victorian Homes, brownstones, and new high-rise condominiums, Jersey City is separated into four districts, each of which contains distinct neighborhoods. The notable Waterfront area offers amazing views of NYC and proximity to Justice State Park.

*In the text box below please suggest corrections (underline suggestions if applicable):* 325

*Jersey City* - Located just outside the <u>Holland</u> Tunnel from NYC, Jersey City is New Jersey's 2nd largest City, with 240,000 residents. A mixture of Victorian Homes, brownstones, and new high-rise condominiums, Jersey City is separated into <u>six</u> districts, each of which contains distinct neighborhoods. The notable Waterfront area offers amazing views of NYC and proximity to <u>Liberty</u> State Park.

*Contact Information (Optional):* 330

Name: Janet Brownington

E-mail: J.Brown@browningtonspace.net

[ Save 320 ]   [ Send 321 ]   [ Cancel 322 ]

DATA THROUGH COMMUNITY FEEDBACK

BACKGROUND

1. Technical Field

The present invention generally relates to computer systems and in particular to software applications in computer memory systems.

2. Description of the Related Art

Traditionally, corporate data is managed by a centralized Information Technology (IT) department. End-users are provided access to corporate data, such as within situational applications, via an identification name and/or password, as well as through anonymous accessibility (for data that allow anonymous access). While much of the data within a situational application is presented through graphical user interfaces, a large quantity of data remains embedded within the application in order to perform various processing functions. Frequently, data is available to view, however the owner, or builder of the situational application remains anonymous. When the builder of a situational application is anonymous, or difficult to contact, mistakes found within the situational application may never be corrected.

Mistakes are often found within the text of an application, within the activity of an application, or in the appearance of an application. Typically, a general corporate help desk facility accepts problem reports; however help desks are rarely intimately knowledgeable about the particular application or function where the end-user has spotted a problem. With a rise in the trend for independent users to develop their own ad-hoc applications (situational applications), a demand for increased end-user access to data is apparent. End-users require a means to intervene in situational application problems without the intervention of an IT department and/or help desk.

SUMMARY OF ILLUSTRATIVE EMBODIMENTS

Disclosed are a method, system and computer program product for providing a framework to enable a builder to construct a situational application, wherein the framework provides access to one or more background data sources. A graphical user interface is displayed to receive feedback inputs, including one or more inputs which describe the problem detected within a data item of a situational application, by an end-user. Feedback inputs may include a unique identifier of the problem data item and identification details of the service from which the data originates. A second input may be of a note, which provides suggestions for improving the data within the data item. Preference information is provided to a notification agent within the framework of the situational application about whether the owner of the data allows direct correction of the data and whether feedback input has to be stored in a problem cache. The feedback input is passed to a notification agent of the framework, which identifies the owner and/or builder of the data. The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for providing a framework to enable a builder to construct a situational application, wherein the framework provides access to one or more background data sources. A graphical user interface is displayed to receive feedback inputs, including one or more inputs which describe the problem detected within a data item of a situational application, by an end-user. Feedback inputs may include a unique identifier of the problem data item and identification details of the service from which the data originates. A second input may be of a note, which provides suggestions for improving the data within the data item. Preference information is provided to a notification agent within the framework of the situational application about whether the owner of the data allows direct correction of the data and whether feedback input has to be stored in a problem cache. The feedback input is passed to a notification agent of the framework, which identifies the owner and/or builder of the data.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions the specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
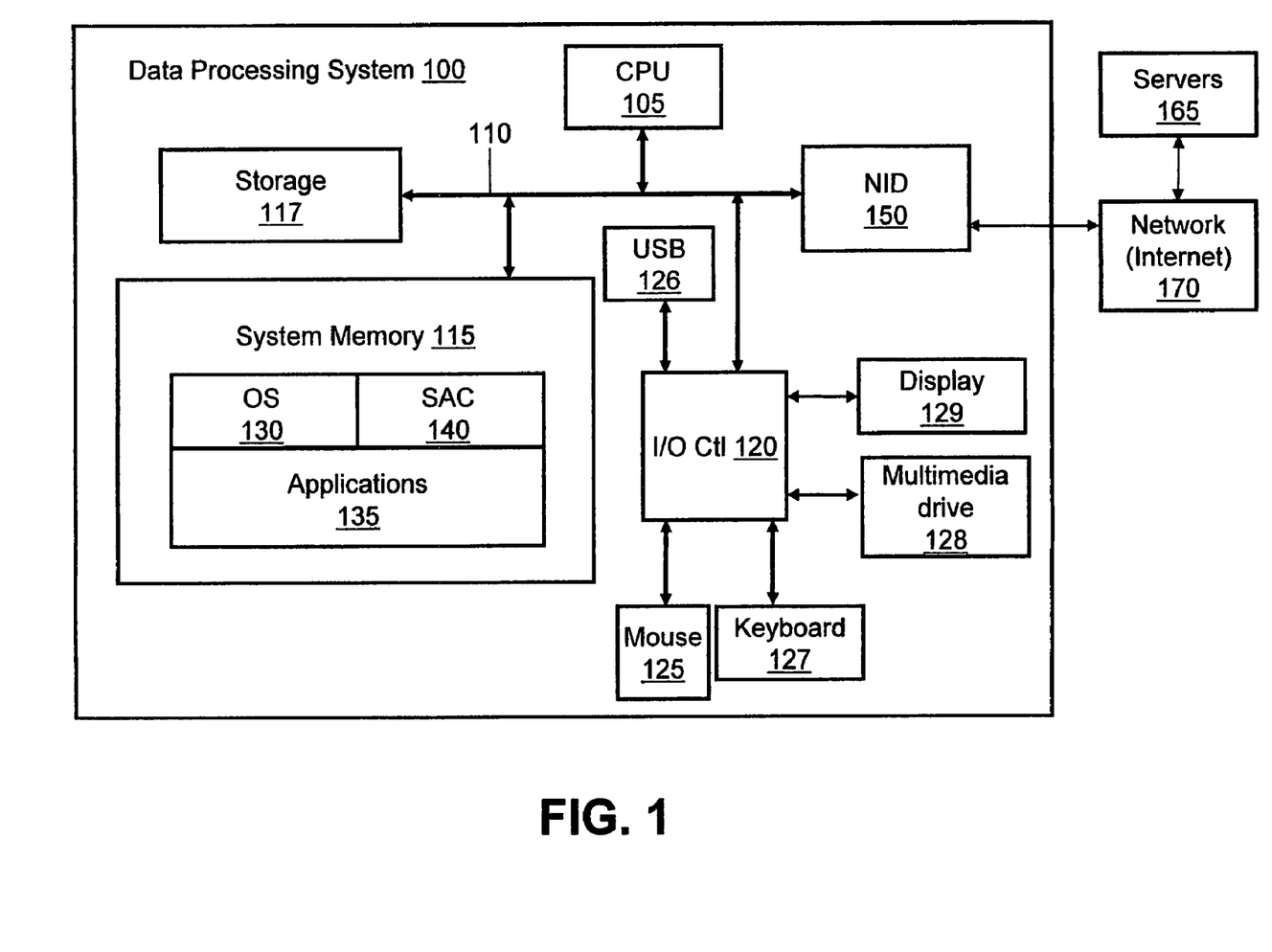
FIG. 1 is a block diagram of a data processing system, within which various features of the invention may advantageously be implemented, according to one embodiment of the invention.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller 120. DPS 100 also comprises storage 117, within which data/instructions/code may be stored.

DPS 100 is also illustrated with a network interface device (NID) 150, with which DPS 100 connects to one or more servers 165 via an access network, such as the Internet 170. In the described embodiments, Internet 450 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135 such as a situational application, and situational application correction (SAC) utility 140. In actual implementation, applications 135 and SAC utility 140 may be combined as a single application collectively providing the various functions of each individual software component when the corresponding code is executed by CPU 105. For simplicity, SAC utility 140 is illustrated and described as a stand alone or separate software/firmware component, which provides specific functions, as described below.

CPU 105 executes SAC utility 140 as well as OS 130, which supports the user interface features of SAC utility 140. In the illustrative embodiment, SAC utility 140 generates/provides several graphical user interfaces (GUI) to enable user interaction with, or manipulation of, the functional features of the utility (140). Among the software code/instructions provided by SAC utility 140, and which are specific to the invention, are: (a) code for providing a framework to enable a builder to construct a situational application, wherein the framework provides access to one or more background data sources; (b) code for displaying a graphical user interface to receive feedback inputs, including one or more inputs describing a problem detected within a data item during one or more of an access to the framework and construction of the situational application; and (c) code for dynamically retrieving (1) identifying information of an owner of the data and (2) preference information about whether the owner of data within a situational application allows direct correction of the data and whether feedback input has to be stored in a problem cache.

For simplicity of the description, the collective body of code that enables these various features is referred to herein as SAC utility 140. According to the illustrative embodiment, when CPU 105 executes SAC utility 140, DPS 100 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
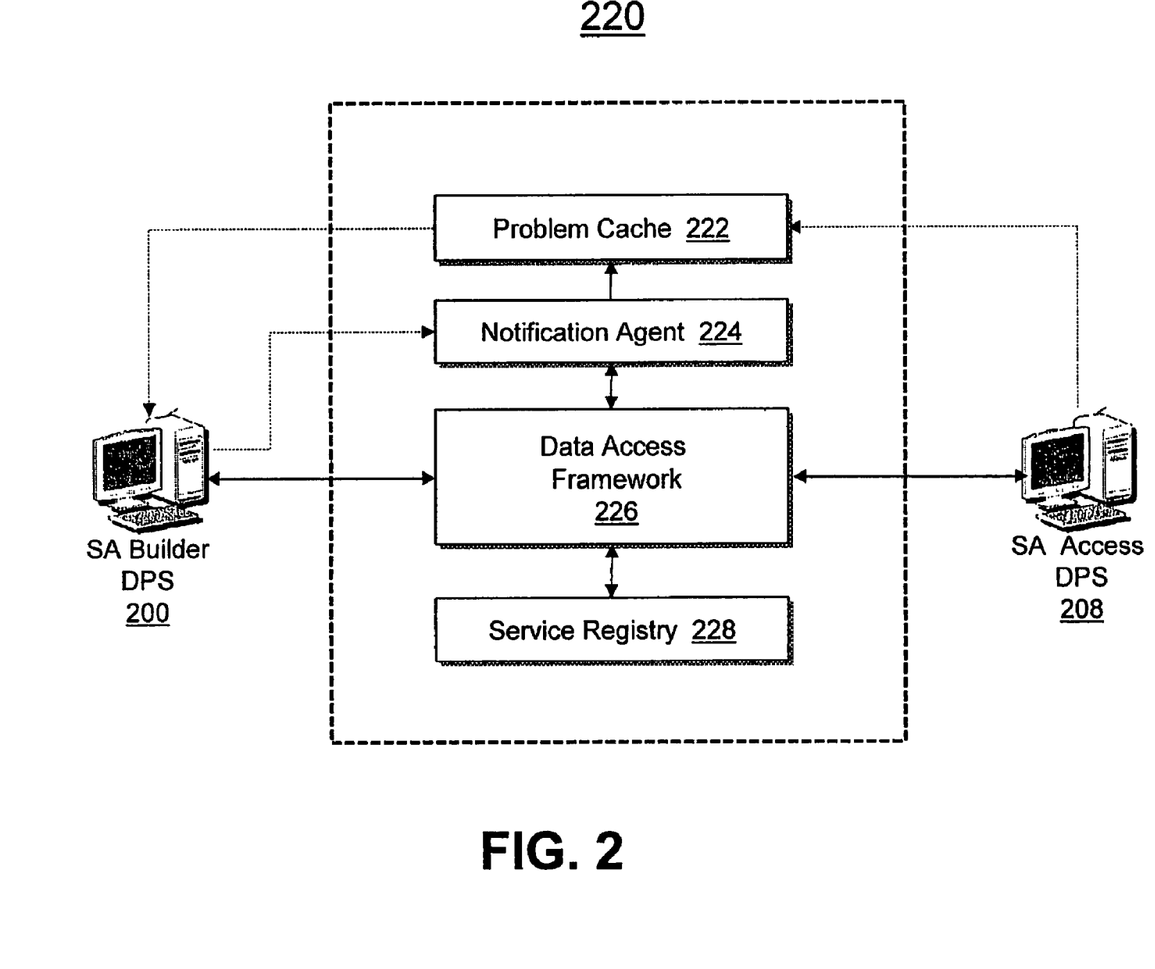
FIG. 2 is a diagram of a network utilizing a situational application in accordance with one embodiment of the invention.

With reference now to FIG. 2, which illustrates situational application (SA) network 220, wherein computers are capable of accessing a situational application via the internet (or a LAN). Within SA network 220 are problem cache 222, notification agent 224, data access framework 226, and service registry 228. SA builder DPS 200 is utilized to build and house the situational application which may be accessed via SA access DPS 208. SA access DPS 208 may be one of several types of computer devices such as: a handheld computer, laptop, or a set of community computers.

In one embodiment, data access framework 226 is utilized to register services that provide access to data sources (e.g. databases and applications). Data access layer 226 manages storage and retrieval of data. The service, registered by data access layer 226, defines what content is provided by the data source. During the registration of a service, a unique registration number for the data, as well as the contact information for the data owner is provided to the service. The contact information of the data owner (e.g. e-mail address, mailing address) and data registration number are stored in service registry 228, which is accessible by data access framework 226.

In one embodiment, a situational application is constructed on SA builder DPS 200. Included in the situational application on SA builder 200 are uniform resource locators (URLs), which correspond with notification agent 224. Notification agent 224 manages the feedback of data problems reported from SA access DPS 208. When the situational application is accessed from SA access DPS 208, the situational application transmits identification details regarding the service of which the data originated. Along with identification details concerning the origination of the data (e.g. the owner of the data source), the unique registration number for the data item is reported to notification agent 224 when a problem with a data item is detected.

In one embodiment, when a situation application is constructed, information is transmitted from SA builder DPS 200 to notification agent 224. The information identifies the owner of the data and preference information about whether the owner of the data allows direct correction of the data and whether the details have to be stored in a problem cache. The builder of the situation application instructs notification agent 224 to direct problems to problem cache 222. When a problem is detected with a data item while accessing the situational application from SA access DPS 208, notification agent directs enquiries and suggested corrections to problem cache 222. Problem cache 222 stores the enquiries and suggested corrections concerning the problem data items from the situational application. The owner of the problem data item is alerted of the problem, and retrieves the enquiries and suggested corrections. The owner may then address the problem.

Figure 3:
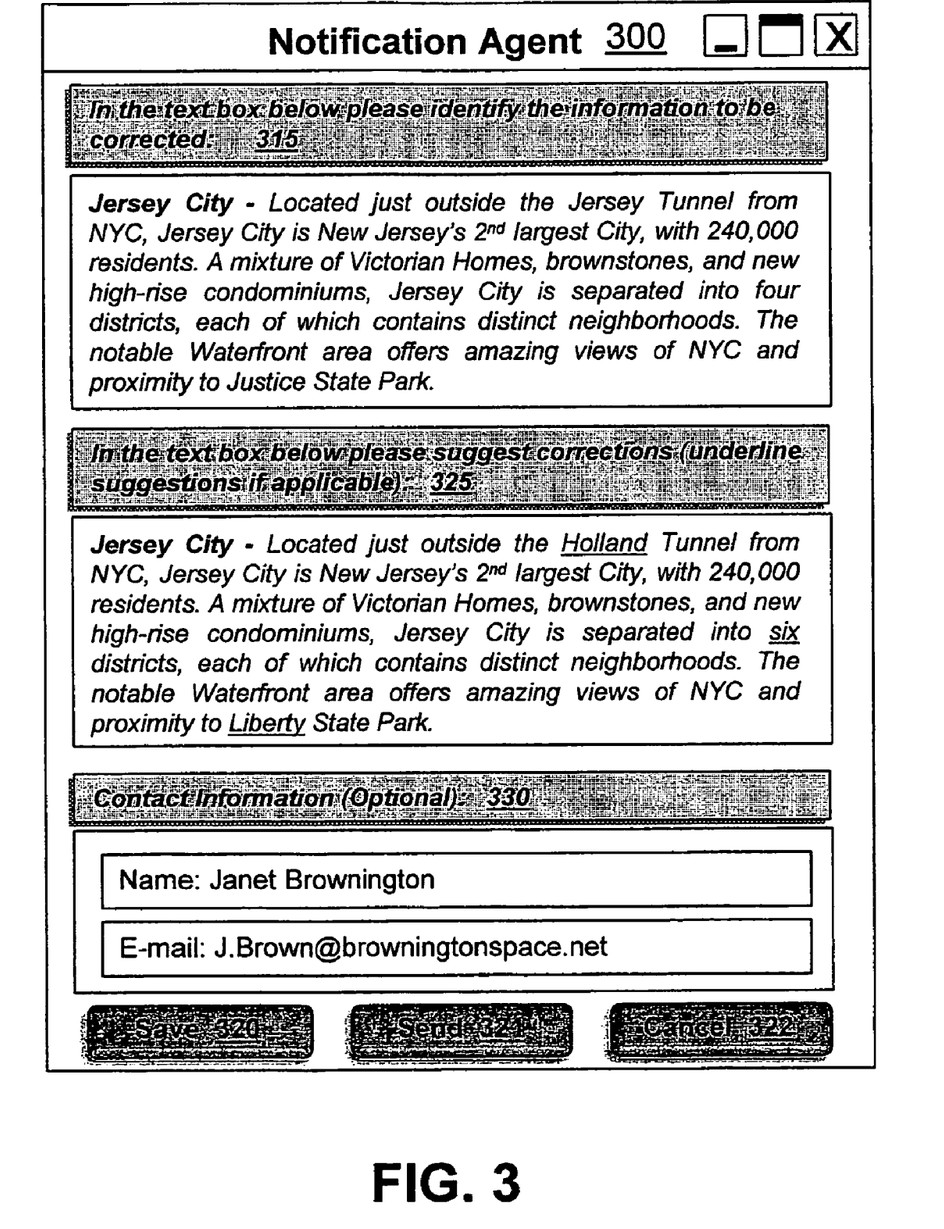
FIG. 3 illustrates a graphical user interface for enabling the entry of feedback input, according to one embodiment of the invention.

FIG. 3 illustrates notification agent GUI 300. Notification agent GUI 300 comprises identity text box 315, correction text box 325, and contact text box 330. Notification agent GUI 300 also includes send selection 321, cancel selection 322, and save button 320.

In one embodiment, notification agent GUI 300 receives feedback inputs, including one or more inputs describing a problem detected within a data item during one or more of an access to data access framework 226 (FIG. 2) and construction of the situational application. The problem data item is identified in identity text box 315. Correction text box 325 receives suggestions for correcting the problem data item. Corrections within correction text box 325 may be further identified by highlighting, underlining, and/or italicizing the suggested correction.

In one embodiment, the detector of the problem data item may include contact information when sending an alert and/or correction suggestions for problem data. Identifying information such as a name and e-mail address may be entered in contact text box 330. Notification agent GUI 300 utilizes send selection 321 to transmit the problem alert and suggested corrections to the problem cache. Information added to notification agent GUI 300 is stored utilizing save button 320. Cancel selection 322 may dismiss a user from notification agent GUI 300 without saving any modified information.

Figure 4:
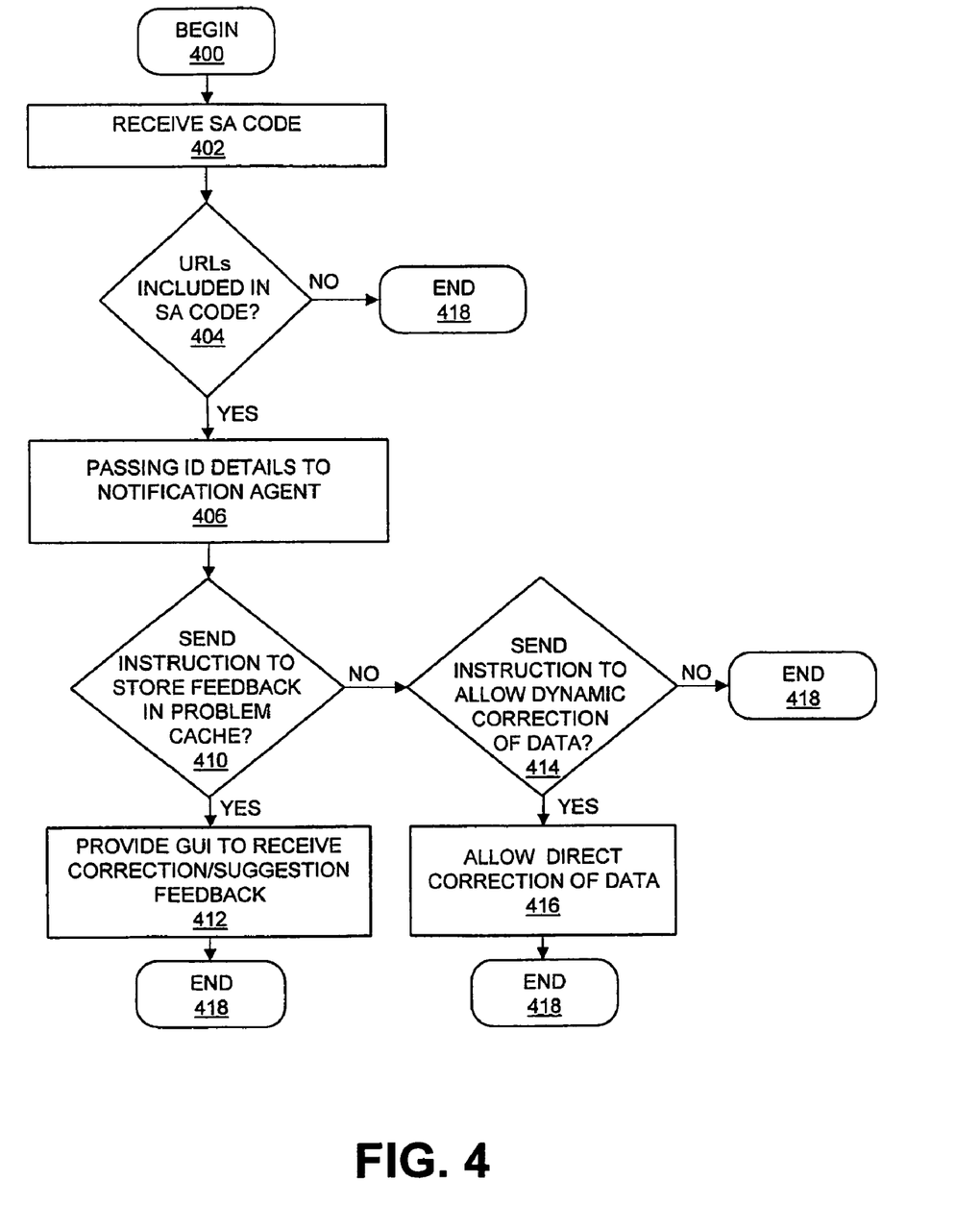
FIG. 4 is a logic flow chart for assigning feedback privilege within a situational application in accordance with one embodiment of the invention.
Figure 5:
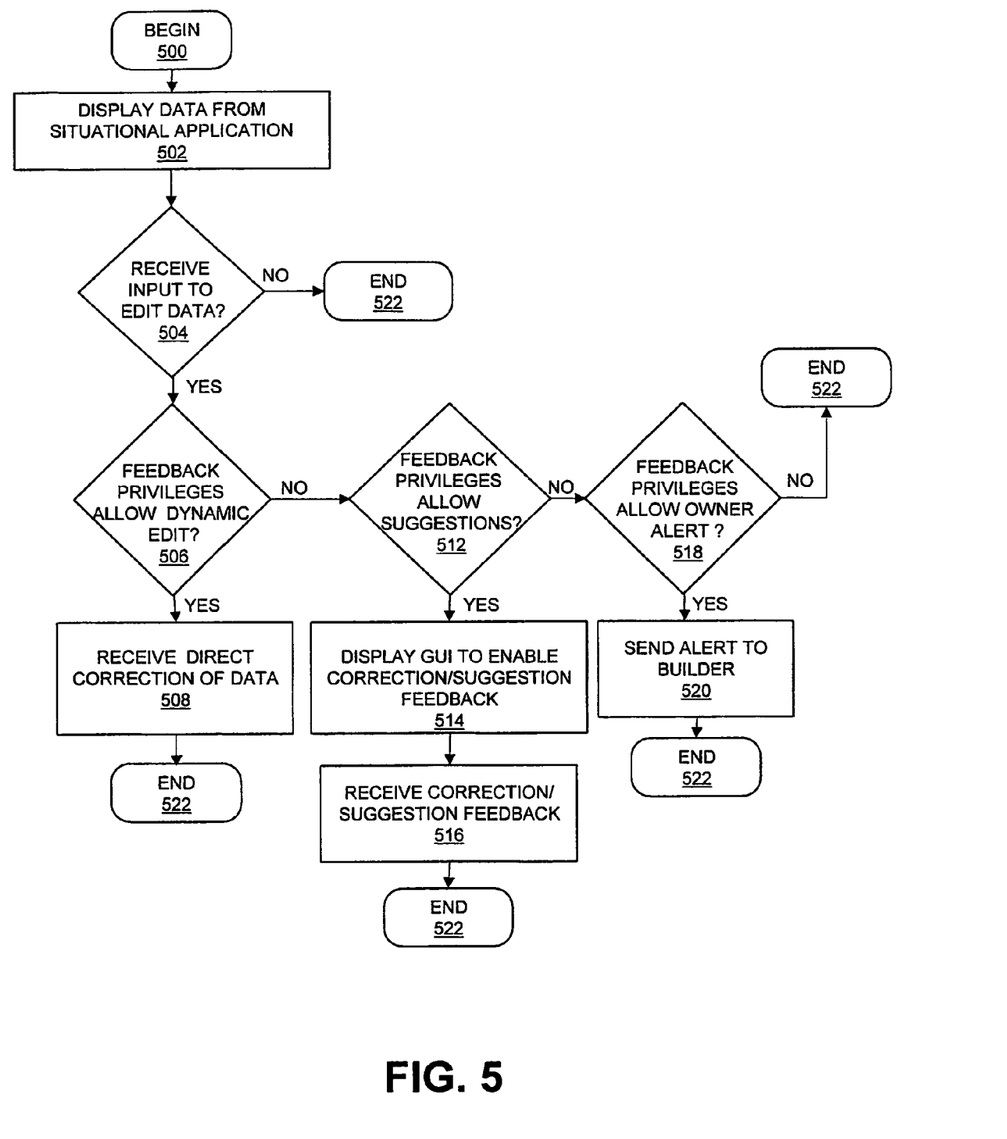
FIG. 5 is a logic flow chart for receiving feedback input within a situational application according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by SAC utility 140 executing within DPS 100 (FIG. 1) and controlling specific operations on DPS 100, and the methods are thus described from the perspective of both SAC utility 140 and DPS 100.

FIG. 4 describes a process for assigning feedback privilege within a situational application. The process of FIG. 4 begins at initiator block 400 and proceeds to block 402, at which code for the situational application (SA) is received. A decision is made at block 404 whether URLs are included in the SA code. If URLs are not included in the SA code the process ends at block 418. If URLs are included in the SA code the processes continues to block 406. At block 406 identification details are passed from the situational application to the notification agent. The identifying information comprises: (1) identifying information of the owner of the data; (2) preference information about whether the owner of the data allows direct correction of the data as well as whether feedback input has to be stored in a problem cache.

At block 410 a decision is made whether to send instruction that will allow feedback input to be stored in the problem cache at block 410. If instruction is sent to store feedback input in the problem cache, the process continues to block 412. If instruction is not sent to store feedback input in the problem cache, the process continues to block 414. At block 412 a GUI is provided with the situational application that receives correction and/or suggestions feedback for problem data items. A decision is made at block 414 whether to send instruction which allows dynamic correction of the problem data. If instruction is not sent to allow dynamic correction of the problem data, the process ends at block 418. If instruction is sent to allow dynamic correction of problem data, dynamic correction for the data item of interest is permitted. The process ends at block 418.

A process for receiving feedback input within a situational application is described in FIG. 5. The process of FIG. 5 begins at block 500 and continues to block 502 at which data from a situational application is displayed. A decision is made at block 504 whether to receive input that allows the data within the situational application to be edited. If input is not received to edit data, the process ends at block 522. If input is received at block 504, the process continues to block 506.

At block 506 a decision is made whether the feedback privileges allow dynamic edit of the problem data. If feedback privileges do not allow direct edit of the problem data, the process continues to block 512. If the feedback privileges allow direct edit of the problem data, the process continues to block 508. At block 508 dynamic corrections of the data is received. At block 512 a decision is made whether the feedback privileges allow suggestions for correction of problem data. If the feedback privileges do not allow suggestions the process continues to block 518. If the feedback privileges allow suggestions for correction to the problem data the process continues to block 514. At block 514 a GUI is displayed to enable entry of information for identifying a location of the problem within the data item. The correction and/or suggestion feedback is received at block 516.

At block 518 a decision is made whether the feedback privileges allow the owner to be alerted of a problem with a data item within a situational application. If the feedback privileges do not allow the owner to be alerted, the process ends at block 522. If the feedback privileges allow the owner to be alerted, the process continues to block 520. When contact information is provided, SAC utility 140 may automatically send a reply message to the identifier of the problem data. At block 520 an alert is sent to the owner/builder of the data item. The process ends at block 522.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   providing a framework to enable a builder to construct a situational application, wherein the framework provides access to one or more background data sources;
   displaying a graphical user interface to receive feedback inputs, including one or more inputs describing a problem detected within a data item associated with the situational application during an access to the framework by an end-user;
   receiving, from the end-user, the one or more inputs when data within the data item contains one or more problems, wherein said feedback inputs also include a unique identifier of the data item and identification details of a service that defines the data provided from the one or more background data sources;
   receiving, from the end-user, a second input of a note, which provides suggestions for improving the data within the data item;
   passing (a) the one or more inputs identifying the data item and the service associated with the detected problem and (b) the second input to a notification agent of the framework; enabling entry of information for identifying a location of the problem within the data item;
   dynamically retrieving (a) identifying information of an owner of the data and (b) preference information about whether feedback privileges allow dynamic editing, accepting suggestions, and sending alerts to the builder and whether details have to be stored in a problem cache;
   when the details to the data and the detected problem are stored in the problem cache, enabling access by the data owner to the problem cache to view the reported problems with the data item; and
   when the owner of the data has enabled direct correction of the data, dynamically correcting the data within the data item based on the second input from the end-user.

2. The method of claim 1 further comprising:
   when the data owner allows feedback privileges dynamically alerting the data owner of a detected problem in the data item of the situational application;
   when the data owner restricts feedback privileges to an alert, dynamically sending an alert to the data owner to identify a problem with the data item through the notification agent;
   enabling the data owner to correct the data item when the data owner restricts the feedback privileges to an alert; and
   automatically sending a message to a sender that identified the problem data when contact information is provided to the data owner of the sender of the problem data alert.

3. A computer program product comprising:
   a computer readable medium; and
   program code on the computer readable medium that when executed by a processor on a computer device provides the functions of:
   providing a framework to enable a builder to construct a situational application, wherein the framework provides access to one or more background data sources;
   displaying a graphical user interface to receive feedback inputs, including one or more inputs describing a problem detected within a data item associated with the situational application during an access to the framework by an end-user;
   receiving, from the end-user, the one or more inputs when data within the data item contains one or more problems, wherein said feedback inputs also include a unique identifier of the data item and identification details of a service that defines the data provided from the one or more background data sources;
   receiving, from the end-user, a second input of a note, which provides suggestions for improving the data within the data item;
   passing (a) the one or more inputs identifying the data item and the service associated with the detected problem and (b) the second input to a notification agent of the framework; enabling entry of information for identifying a location of the problem within the data item; dynamically retrieving (a) identifying information of an owner of the data and (b) preference information about whether feedback privileges allow dynamic editing, accepting suggestions, and sending alerts to the builder and whether details have to be stored in a problem cache;
   when the details to the data and the detected problem are stored in the problem cache, enabling access by the data owner to the problem cache to view the reported problems with the data item; and
   when the owner of the data has enabled direct correction of the data, dynamically correcting the data within the data item based on the second input from the end-user, wherein the computer readable medium is a non-transitory computer readable storage medium.

4. The computer program product of claim 3, further comprising program code for:
   when the data owner allows feedback privileges dynamically alerting the data owner of a detected problem in the data item of the situational application;
   when the data owner restricts feedback privileges to an alert, dynamically sending an alert to the data owner to identify a problem with the data item through the notification agent; enabling the data owner to correct the data item when the data owner restricts the feedback privileges to an alert; and automatically sending a message to a sender that identified the problem data when contact information is provided to the data owner of the sender of the problem data alert.

5. A computer system comprising:

a processor component;

a user interface that enables feedback entry by a user of a situational application; and a utility executing on the processor component and which comprises codes that enables completion of the following functions:

providing a framework to enable a builder to construct a situational application, wherein the framework provides access to one or more background data sources;

displaying a graphical user interface to receive feedback inputs, including one or more inputs describing a problem detected within a data item associated with the situational application during an access to the framework by an end-user;

receiving, from the end-user, the one or more inputs when data within the data item contains one or more problems, wherein said feedback inputs also include a unique identifier of the data item and identification details of a service that defines the data provided from the one or more background data sources;

receiving, from the end-user, a second input of a note, which provides suggestions for improving the data within the data item; passing (a) the one or more inputs identifying the data item and the service associated with the detected problem and (b) the second input to a notification agent of the framework;

enabling entry of information for identifying a location of the problem within the data item;

dynamically retrieving (a) identifying information of an owner of the data and (b) preference information about whether feedback privileges allow dynamic editing, accepting suggestions, and sending alerts to the builder and whether details have to be stored in a problem cache;

when the details to the data and the detected problem are stored in the problem cache, enabling access by the data owner to the problem cache to view the reported problems with the data item; and when the owner of the data has enabled direct correction of the data, dynamically correcting the data within the data item based on the second input from the end-user.

6. The computer system of claim 5, wherein said utility further comprises code for:

when the data owner allows feedback privileges dynamically alerting the data owner of a detected problem in the data item of the situational application;

when the data owner restricts feedback privileges to an alert, dynamically sending an alert to the data owner to identify a problem with the data item through the notification agent;

enabling the data owner to correct the data item when the data owner restricts the feedback privileges to an alert; and automatically sending a message to a sender that identified the problem data when contact information is provided to the data owner of the sender of the problem data alert.

* * * * *